US008656656B2

(12) United States Patent
Grunewald

(10) Patent No.: US 8,656,656 B2
(45) Date of Patent: Feb. 25, 2014

(54) ROOF DRAINAGE FOR TRUCKS

(76) Inventor: Niclas Grunewald, Hamburg (DE)

( * ) Notice: Subject to any disclaimer, the term of this patent is extended or adjusted under 35 U.S.C. 154(b) by 122 days.

(21) Appl. No.: 12/312,561

(22) PCT Filed: Nov. 23, 2007

(86) PCT No.: PCT/EP2007/010214
§ 371 (c)(1),
(2), (4) Date: May 15, 2009

(87) PCT Pub. No.: WO2008/061790
PCT Pub. Date: May 29, 2008

(65) Prior Publication Data
US 2010/0058682 A1  Mar. 11, 2010

(30) Foreign Application Priority Data
Nov. 23, 2006 (DE) .......................... 10 2006 055 701

(51) Int. Cl.
*E04B 1/34* (2006.01)
*E04D 13/00* (2006.01)
*E04D 13/08* (2006.01)
*E04B 1/70* (2006.01)
*B60R 13/07* (2006.01)

(52) U.S. Cl.
USPC ...... 52/173.2; 52/11; 52/15; 52/16; 52/302.1; 52/2.12; 296/213

(58) Field of Classification Search
USPC .................. 52/173.2, 11, 15, 16, 302.1, 2.12; 296/213
See application file for complete search history.

(56) References Cited

U.S. PATENT DOCUMENTS

| 1,415,794 | A | * | 5/1922 | Charbonneau | 296/213 |
| 1,755,453 | A | * | 4/1930 | Mullen | 248/48.1 |
| 3,091,816 | A | * | 6/1963 | Wetzel | 108/172 |
| 3,299,570 | A | * | 1/1967 | Radcliffe | 49/27 |
| 4,085,966 | A | | 4/1978 | Ringe | |
| 4,216,990 | A | * | 8/1980 | Musgrove et al. | 296/213 |
| 4,367,470 | A | * | 1/1983 | Tadokoro et al. | 340/13.37 |
| 4,951,430 | A | * | 8/1990 | Gottlieb | 52/11 |
| 5,588,261 | A | | 12/1996 | MacConochie | |
| 5,622,016 | A | * | 4/1997 | Frommelt et al. | 52/173.2 |
| 5,706,608 | A | * | 1/1998 | Sweet | 52/11 |
| 5,752,347 | A | | 5/1998 | Osborn | |
| 6,125,593 | A | * | 10/2000 | Randolph et al. | 52/16 |
| 6,276,098 | B1 | | 8/2001 | Berends et al. | |
| 6,389,755 | B1 | | 5/2002 | Wenner | |
| 6,425,214 | B1 | | 7/2002 | Boffeli et al. | |

(Continued)

FOREIGN PATENT DOCUMENTS

DE  1 758 902  12/1957
DE  27 41 792   5/1979

(Continued)

OTHER PUBLICATIONS

International Search Report.

*Primary Examiner* — Brian Glessner
*Assistant Examiner* — Omar Hijaz
(74) *Attorney, Agent, or Firm* — Collard & Roe, P.C.

(57) ABSTRACT

The invention relates to a roof drainage for trucks (I). In order to prevent damage to the loaded goods by water dripping from the roof edge, an adjustable gutter (II) underneath the roof edge is proposed.

12 Claims, 6 Drawing Sheets

(56) References Cited

U.S. PATENT DOCUMENTS

Figure 1:
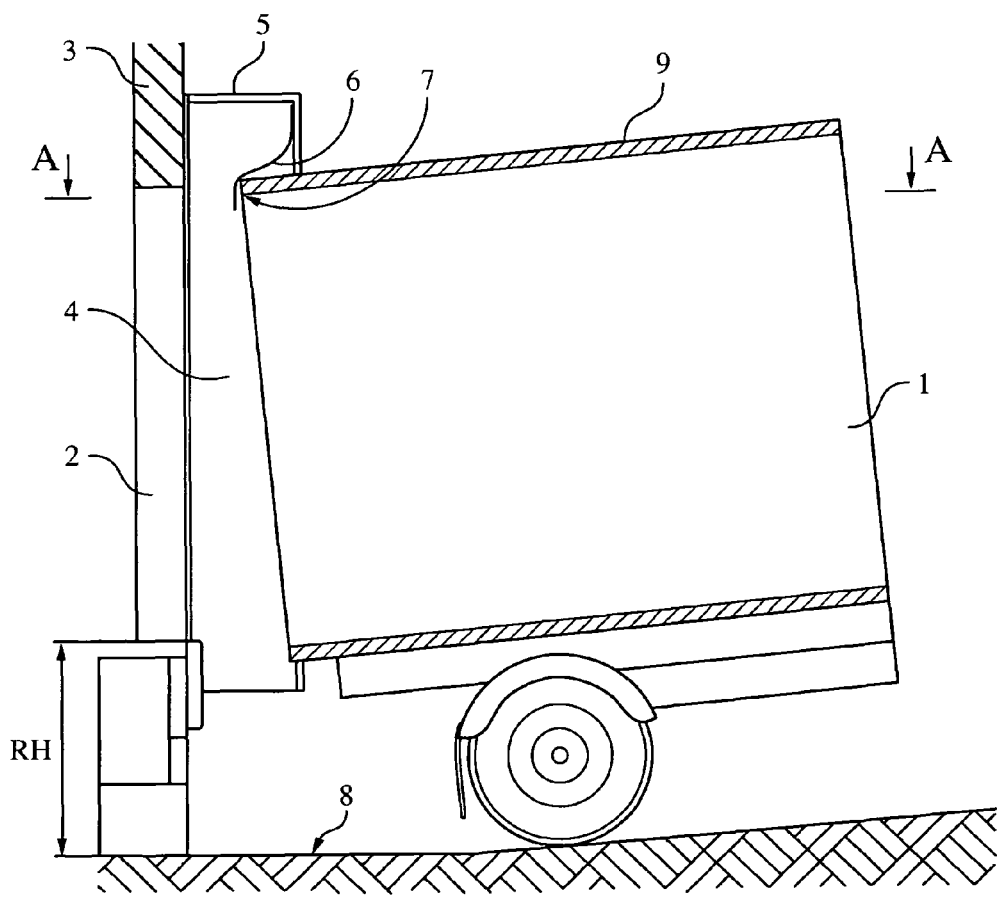

| | | | |
|---|---|---|---|
| 6,488,069 B1 * | 12/2002 | Mashaw et al. | 160/67 |
| 6,880,301 B2 * | 4/2005 | Hahn et al. | 52/173.1 |
| 7,185,463 B2 * | 3/2007 | Borgerding | 52/173.2 |
| 2002/0100223 A1 * | 8/2002 | Brochu | 52/12 |
| 2003/0033756 A1 * | 2/2003 | Adams et al. | 52/11 |
| 2005/0166488 A1 | 8/2005 | Borgerding | |
| 2006/0090407 A1 * | 5/2006 | Hoffmann et al. | 52/173.2 |
| 2007/0079560 A1 * | 4/2007 | Yilas | 52/12 |
| 2007/0079942 A1 * | 4/2007 | Snyder et al. | 160/113 |

FOREIGN PATENT DOCUMENTS

| | | |
|---|---|---|
| DE | 27 51 792 | 5/1979 |
| EP | 0 493 713 | 7/1992 |
| GB | 2 413 340 | 10/2005 |

\* cited by examiner

SECTION A-A

SECTION A-A

SECTION A-A

SECTION A-A

ROOF DRAINAGE FOR TRUCKS

CROSS REFERENCE TO RELATED APPLICATIONS

This application is the National Stage of PCT/EP2007/010214 filed on Nov. 23, 2007, which claims priority under 35 U.S.C. §119 of German Application No. 10 2006 055 701.8 filed on Nov. 23, 2006. The international application under PCT article 21(2) was not published in English.

The invention relates to a roof drainage for trucks.

When it rains, or when snow or ice on the roof of a truck melt, the formation of streams or drops can occur, causing a problem when loading and unloading trucks. This formation of streams or drops occurs to an even greater degree if the truck is standing on a traffic surface that is inclined toward the rear loading opening. In such cases, a large part of the water raining onto the roof can run off by way of the rear roof edge of the truck. This can cause the goods being loaded to be damaged by the stream of water flowing down. In extreme cases, the loading procedures actually have to be interrupted, and this leads to disruption of operations.

To avoid such problems, the American patent application US 2005/0166488 A1 proposes a rainwater deflector that is disposed to hang down freely at a distance above a building opening. A truck driving up to a building opening equipped in this manner drives underneath the rainwater deflector, so that the latter rests on the roof of the truck. However, the effectiveness of such a rainwater deflector is restricted to truck superstructures having a box shape. The rainwater deflector does not adapt itself to other shapes of the truck roof. Particularly in those cases where the roof tarp of the truck is sagging, water can flow underneath the rainwater deflector, and in these cases, it becomes ineffective.

It is the task of the invention to propose a roof drainage for trucks, which can be used even for different types of truck superstructures, while maintaining its effectiveness.

This task is accomplished in that the roof drainage is configured as a gutter and disposed below a gap between the rear roof edge region of a truck and a loading door opening. The gutter, which is disposed underneath the rear roof edge of the truck superstructure, reliably catches the drops that fall from the roof edge, and passes them out of the region that is supposed to remain clear at the loading door opening, for loading and unloading the truck.

The gutter can be attached to the truck. It then extends over the entire inside width of the truck, from which it passes the amounts of water that drip off the edge towards the side.

Accordingly, the invention includes the variations of (1) a roof drainage, (2) a roof-drainage system including a truck, a building, and a roof drainage attached to the building, and (3) a roof-drainage system including a building having an unloading dock and a roof drainage attached to the building.

It is advantageous if at least one side wall, preferably both the truck-side wall and the building-side wall, of the gutter is/are configured to be extended by means of side wall extensions, in order to balance out the approach tolerances of trucks to the building opening, and to be able to reliably catch the falling drops. A truck-side wall extension lays itself against the ceiling of the truck from below, for example, and a building-side wall extension forms a seal relative to the building wall, and thus prevents overflowing of the gutter.

The effect of the gutter is improved if it is configured to be vertically adjustable. For this purpose, it can be moved in vertically adjustable manner, below the roof edge of a truck, in vertical guides that are attached to the building, in order to reliably catch all the falling drops.

If the gutter is configured to be horizontally adjustable parallel to its longitudinal axis, lateral approach tolerances of parking trucks can also be balanced out.

The measure that the gutter is configured to be horizontally adjustable perpendicular to its longitudinal axis also serves for its more precise positioning relative to the position of the truck roof edge.

In order to prevent damage to the downspout of the gutter by the loading equipment that travels on the loading area, it is provided that the gutter has a downspout that is disposed outside of a loading door opening.

Because the gutter and/or the truck-side wall extension is configured to be shorter in its longitudinal axis than the width of a loading opening of a truck, the truck-side wall extension, in particular, projects partway into the loading space of the truck.

If one side wall extension, preferably the truck-side wall extension, is configured so that it can fold, preferably about an axis parallel to the gutter axis, it can be put into a vertical position for the rest position. In this position, it is protected from damage caused by docking trucks.

Because the other side wall extension is configured as a curtain, preferably as a curtain that rolls up automatically, it seals the gutter with regard to the building, and automatically adapts to the changeable position of the gutter in terms of its vertical expanse.

The adjustment movements mentioned above can be facilitated if the gutter has at least one motorized setting drive. Depending on the degrees of freedom that are implemented for the gutter, in terms of design, adjustment by means of a motor can be generated for each degree of freedom, or also by means of coupling multiple degrees of freedom at the same time, in powered manner. Possible motors that can be used are, particularly for the linear setting movements, piston/cylinder drives or spindle/nut drives. The vertical adjustment can be implemented very advantageously by means of a tubular motor, for example, which winds the curtain, i.e. the building-side wall extension, up and down. In this connection, the motor simultaneously serves as a winding shaft.

Because the at least one motorized setting drive has an effect connection to a loading door control or load transfer bridge control, the individual movements can also be locked in with extensively automated docking of trucks. The movements of the gutter are then automatically taken over by the control of the loading gate or load transfer bridge.

In order to prevent water from overflowing laterally over the gutter or its side wall, it is advantageous to provide the side wall extension and/or the gutter ends with overflow barriers.

The truck-side wall extension can also advantageously be adapted to the inside width of a truck superstructure, in that the truck-side wall extension is configured to be adjustable in length, in the longitudinal direction of the gutter. The truck-side wall extension can be configured so that it is divided and overlaps. As soon as the truck-side wall extension has been brought into position, it can subsequently be extended in such a manner that its outer edges can make contact with the side walls of a truck superstructure, on the inside.

For facilitated, particularly manual handling of the gutter, it is advantageous to provide that the roof drainage has a weight compensation mechanism. In this way, the gutter can automatically follow the spring path of the truck that occurs during loading and unloading.

The weight compensation mechanism can be configured as a spring shaft and/or as a counterweight, for example.

The invention will be described in an example, in a preferred embodiment, making reference to a drawing, whereby additional advantageous details can be derived from the figures of the drawing.

In this connection, parts that have the same function are provided with the same reference symbols.

Figure 2:
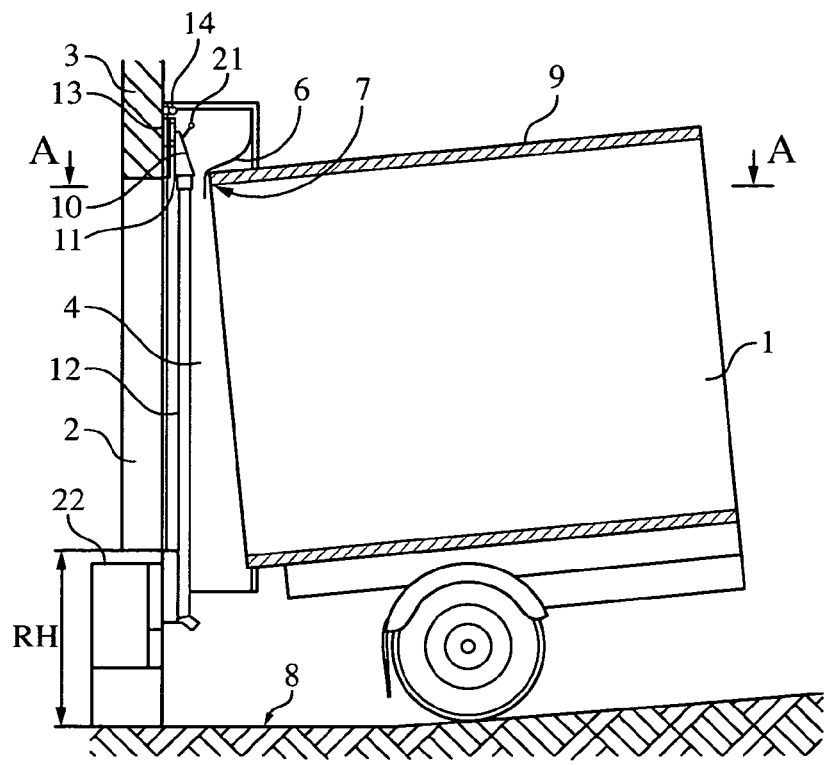
Figure 3:
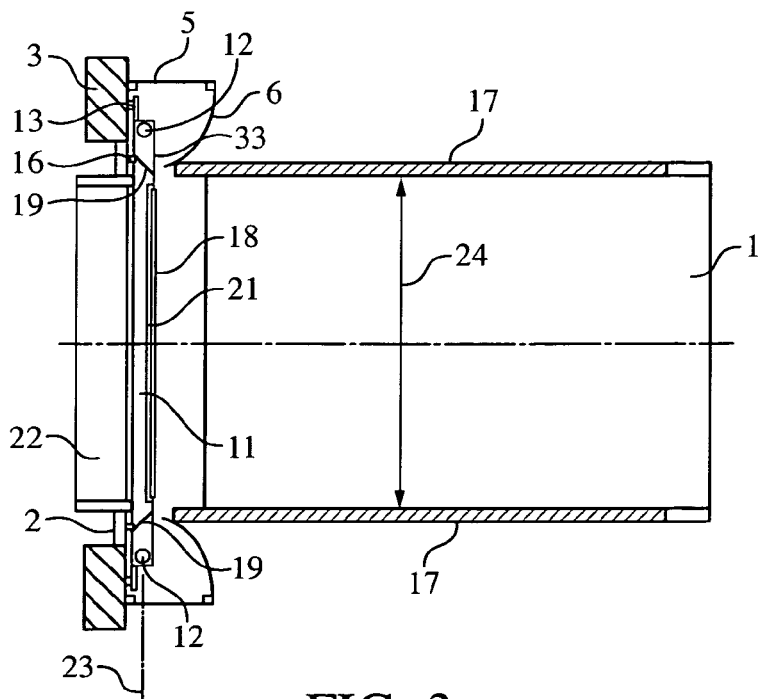
Figure 4:
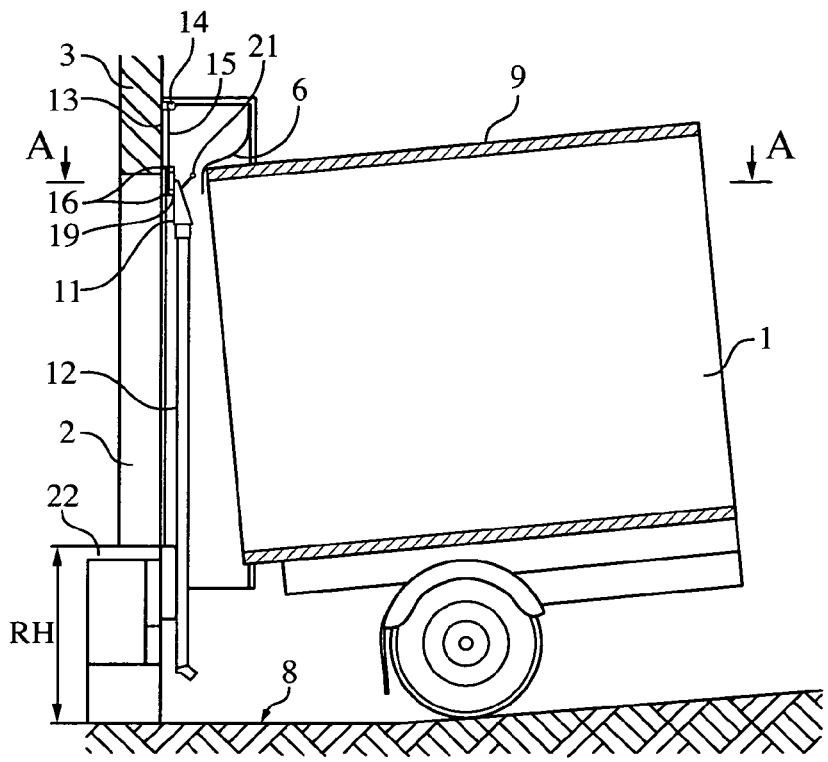
Figure 5:
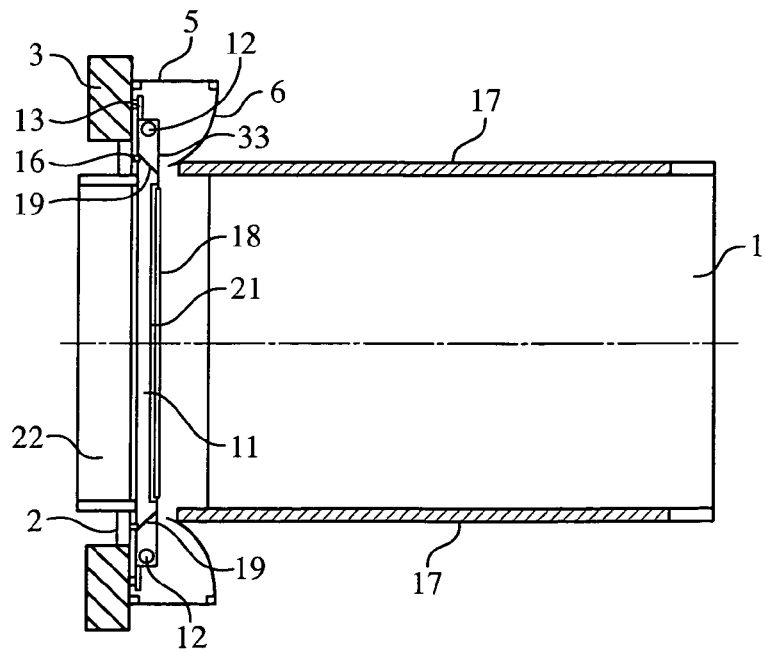
Figure 6:
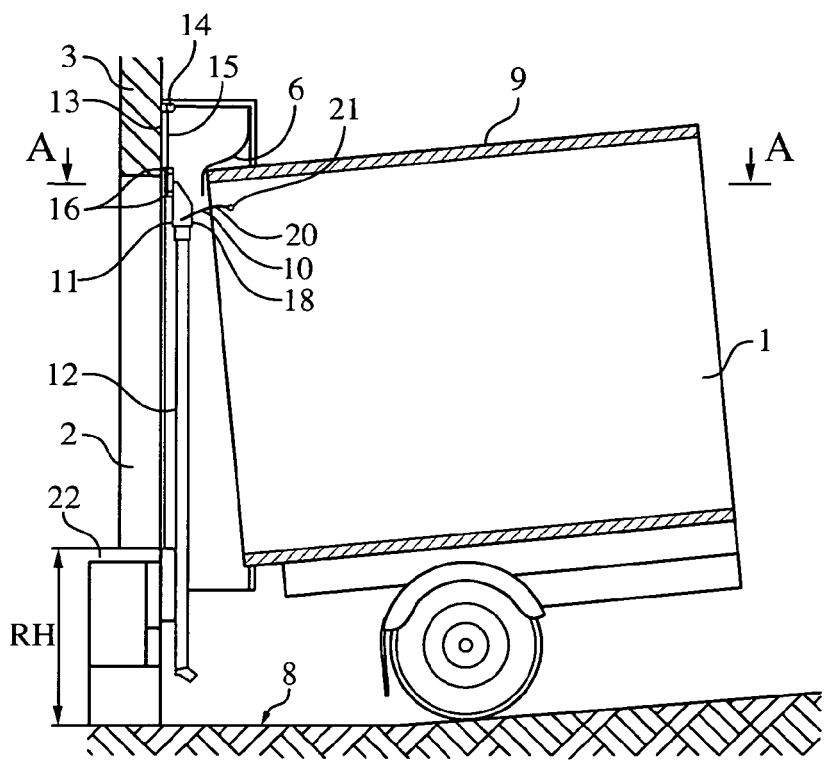
Figure 7:
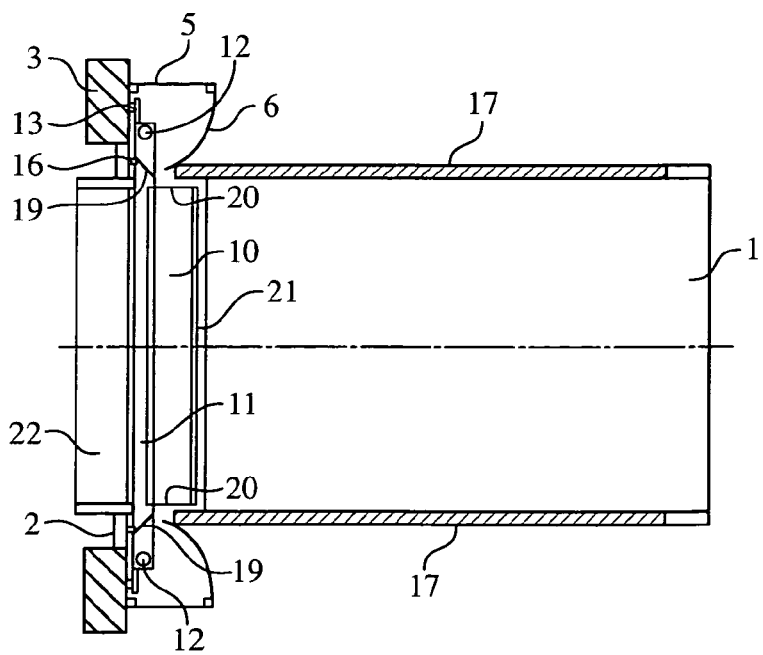
Figure 8:
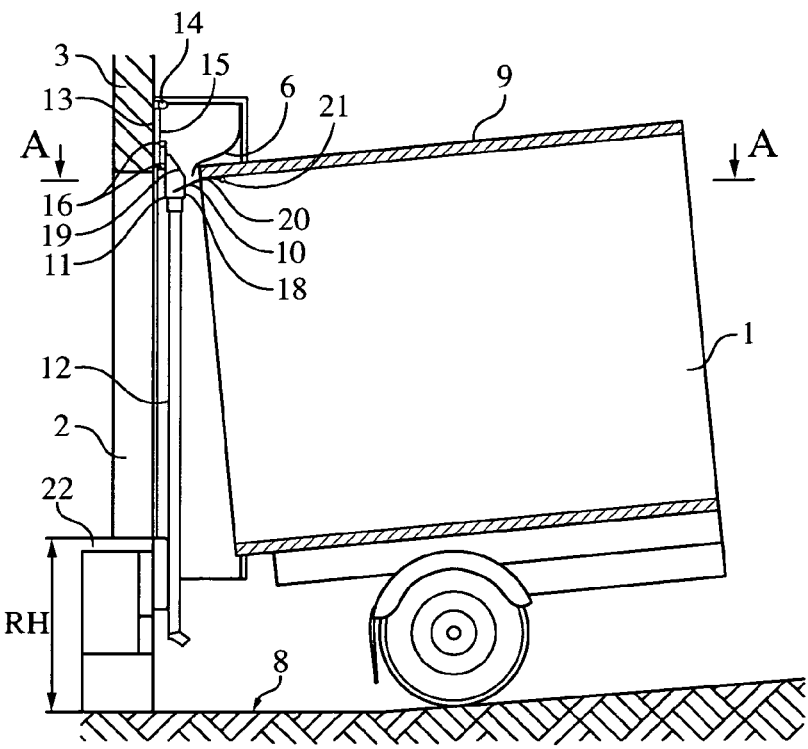
Figure 9:
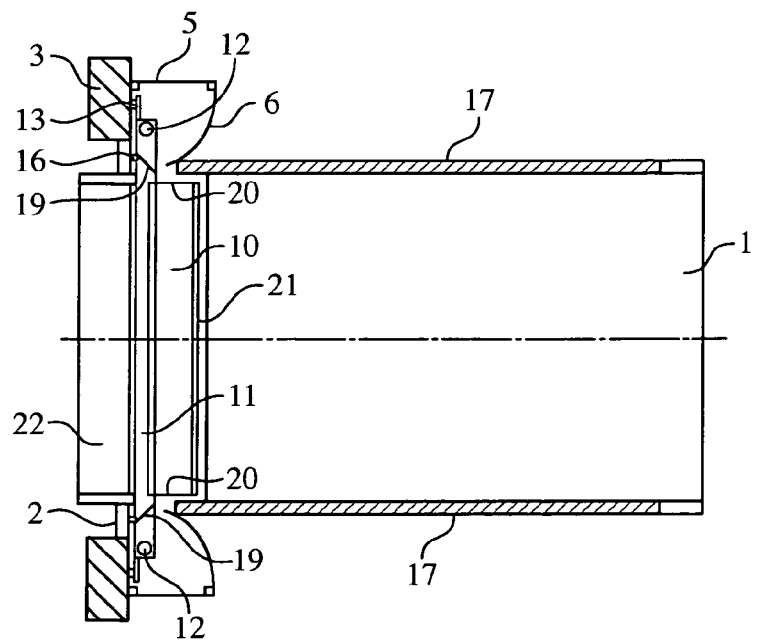
Figure 10:
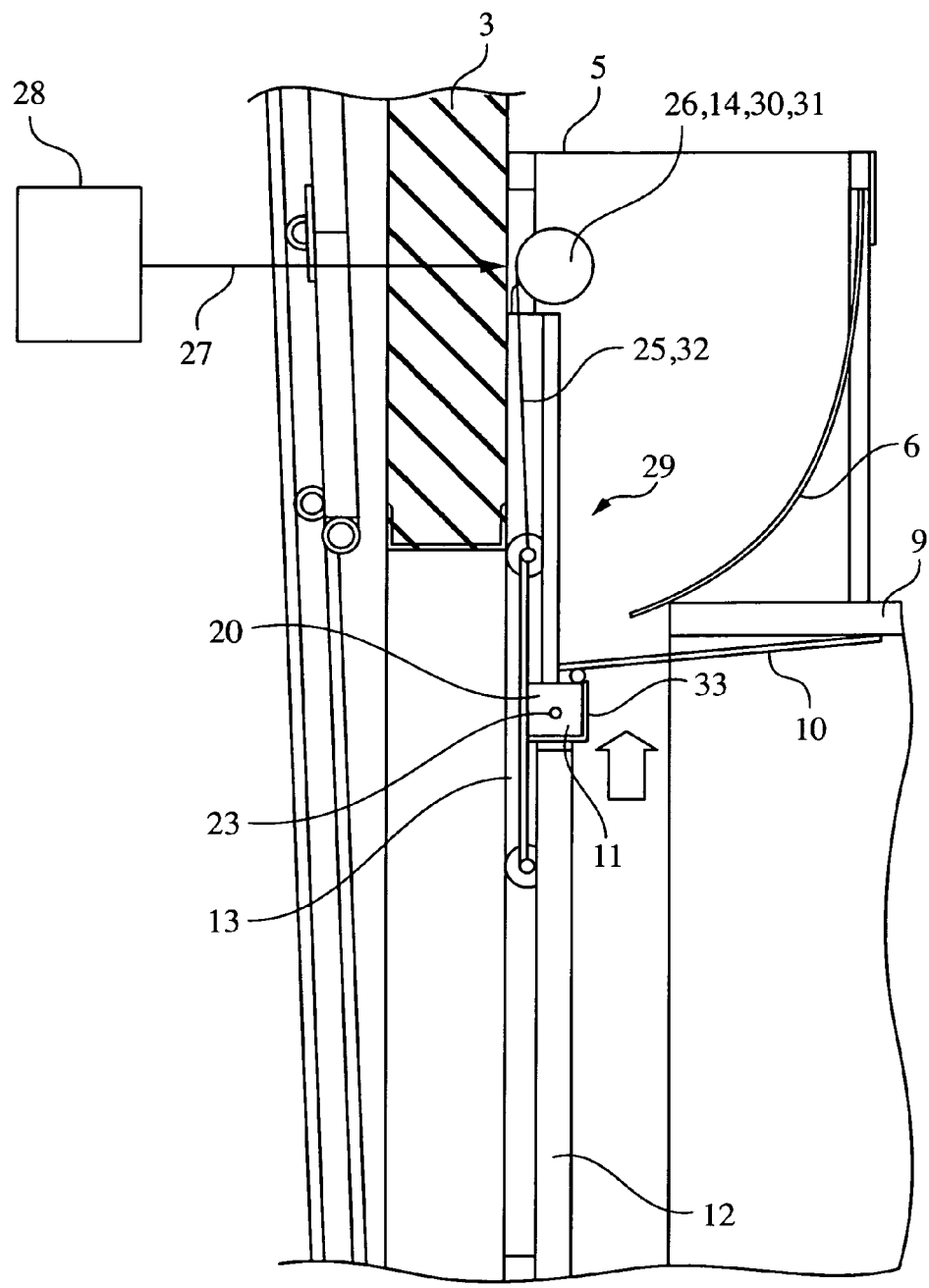

The figures of the drawing show, in detail:

FIG. 1: a vertical section through a typical situation of a truck made available at a loading door opening, FIG. 2: a vertical section according to FIG. 1, with the roof drainage according to the invention in the rest position, FIG. 3: a horizontal section according to the section line A-A in FIG. 2, FIG. 4: a vertical section according to FIG. 1, with the roof drainage according to the invention in the pulled-down position, FIG. 5: a horizontal section according to FIG. 1, with the roof drainage according to the invention in FIG. 4, FIG. 6: a vertical section according to FIG. 1, with the roof drainage according to the invention in a position in which it can be folded out, FIG. 7: a horizontal section according to FIG. 1, with the roof drainage according to the invention in FIG. 6, FIG. 8: a vertical section according to FIG. 1, but with the roof drainage according to the invention in the working position, FIG. 9: a horizontal section according to the section line A-A in FIG. 8, and FIG. 10: a vertical section of the roof drainage in the working position, as an enlarged representation.

FIG. 1 shows a truck 1 that has driven up to a loading door opening 2 in a building wall 3. The distance 4 between building wall 3 and truck 1 is bridged by a loading door seal 5, forming a seal. The blades 6 come to lie against the upper edge 7 of the truck as the truck 1 drives into the loading door seal 5.

The traffic surface 8 is inclined toward the opening 2, so that the truck cannot unintentionally roll away from the loading door opening 2. In this connection, any melt water or rainwater on the roof 9 of the truck runs in the direction of the building opening, and then drips down along the blades 6, after it reaches the edge 7, within the distance 4 between the truck and the building wall 3.

The roof drainage according to the invention serves to avoid this situation. This roof drainage is shown in FIGS. 2, 4, 6, 8, and 10 in vertical section, and in FIGS. 3, 5, 7, and 9 in horizontal section. The water that drips off the blades 6 first reaches a folded-out truck-side wall extension 10 connected to a truck-side wall 33 of the gutter 11, and is passed into the gutter 11 by this truck-side wall extension 10. Overflowing of the gutter is prevented by the opposite building-side wall extension 25 (FIG. 10), which is configured in the form of a curtain 32 that can be wound onto the shaft 31. The end of the curtain 32 is connected with the edge of the gutter 11. From the gutter 11, the water then gets onto the traffic surface 8, by way of downspouts 12, and there it is taken up by the usual drainage system.

In order to be able to bring the gutter 11 into position, it is attached to vertical guides 13. The vertical guides 13 allow a height adjustment of the gutter relative to the building wall 3. A spring shaft 14 is provided for stress relief; its reset force is slightly greater than the weight of the entire gutter. The spring shaft 14 pulls the gutter 11 upward, by way of the rope 15 or the curtain 32, so that the truck-side wall extension 10 comes to lie against the inner surface of the roof 9. The building-side wall extension 25, i.e. curtain 32, is attached to the opposite gutter edge.

In addition, the gutter 11 has horizontal guides 18, so that it can also be displaced horizontally, in order to be able to position the truck-side wall extension 10 between the side walls 17 of the truck 1. Instead, the truck-side wall extension 10 can also be attached to the gutter 11 so as to be horizontally displaceable, and the gutter in turn can be firmly connected with the building wall 3.

The truck-side wall extension 10 is mounted on the front edge of the gutter 11 so as to pivot about the axis 18. Two tension springs 19 that engage on the sides hold the extension in the position shown, so that it presses against the inside edge of the roof 9 with slight spring pressure.

The truck-side wall extension 10 can be configured so that it is divided and overlaps, so that its width can also be adapted to the width 24 of the loading opening of the truck superstructure.

In a preferred embodiment, the winding shaft 31 is provided with a tubular motor as a setting drive 26. The weight of the gutter 11 acts on the end of the curtain 32 that is vertically rolled up onto or unrolled from the tubular motor, and thus determines the height position of the gutter. The motor is controlled by a load transfer bridge control 28, by means of an effect connection 27. The motor has an operating mode in which it follows the vertical movements of the truck.

If the load transfer bridge is moved into its operating position, for example, this is also done for the roof drainage, which is locked into the commands for controlling the load transfer bridge, in suitable manner.

Pieces of sheet metal disposed on the sides provide an overflow barrier 20, so that even if there is only a slight incline, the water captured by the extension 10 reliably gets into the gutter 11. The truck-side wall extension 10 can additionally be supplemented with an elastic sealing lip 21, in order to achieve an even better seal with regard to the truck.

All the adjustment movements of the gutter with its attachments can also be produced in powered manner, for easier handling. Not only electrical but also pneumatic or hydraulic drives are available.

However, the roof drainage can be activated manually, in particularly simple and robust manner. Before the truck 1 is driven up, the roof drainage is pulled down manually, by means of a handle, not shown, along its vertical guide 13, so that the truck can drive into the loading door seal 5. In this connection, the truck-side wall extension 10 is at first held in its vertical position by the spring 19. As soon as the truck is secured in the loading and/or unloading position, the truck-side wall extension 10 is manually folded out from its vertical position, into the folded-out position shown in the drawing. The reset force of the spring 19 balances out the folding moment of the extension. As soon as the roof drainage is then let go, the spring shaft 14 pulls the gutter 11, and. with it the truck-side wall extension 10, up on the vertical guide, by means of the curtain 32, so that the sealing lip 21 comes to lie against the roof 9 of the truck 1.

After the loading procedures have been completed, the gutter is manually pulled downward again, against the reset moment of the spring shaft 14, and the truck-side wall extension 10 is brought into position. After letting go, the spring shaft 14 then pulls the gutter 11 vertically back upward into the standby position of the roof gutter, along the vertical guides 13. Because of the reset moment of the spring shaft, the gutter automatically follows the spring action of the truck during loading, and remains in this position even when the spring force is released, when the truck is being unloaded. The gutter downspouts 12 are disposed to the side of the loading door opening 2, so that the downspouts lie outside of the area at risk from loading equipment, and also cannot be damaged by approaching trucks. The lateral distance of the gutter from the loading door seal 5 allows its horizontal adjustment, in order to be able to adapt the truck-side wall extension 10 to the position of the truck 1, in each instance, in this way. As has been mentioned, instead, the truck-side wall extension 10 can also be mounted on the gutter 11 so as to be horizontally displaceable, and can serve for adaptation to the position of the truck.

Any drives of the roof drainage that might be provided, with suitable sensors for detecting the position of the truck, can be locked into the control of a load transfer bridge 22 in such a manner that the movement sequences described above can take place automatically, to a great extent.

In this manner, weather-related interruptions of the loading activities can advantageously be avoided by means of the roof drainage system according to the invention.

Reference Symbol List

1 truck
2 loading door opening
3 building wall
4 distance
5 loading door seal
6 blade
7 edge
8 traffic surface
9 roof
10 truck-side wall extension
11 gutter
12 downspout
13 vertical guides
14 spring shaft
15 rope, curtain
16 horizontal guide
17 side wall (truck)
18 axle
19 tension spring
20 overflow barrier
21 sealing lip
22 load transfer bridge
23 longitudinal axis
24 loading opening width
25 building-side wall extension
26 setting drive
27 effect connection
28 load transfer bridge control
29 roof drainage
30 weight compensation mechanism
31 shaft
32 curtain
33 truck-side wall

The invention claimed is:

1. A roof drainage for trucks, the roof drainage comprising:
   a gutter comprising a truck-side wall;
   a truck-side wall extension connected to the truck-side wall; and
   vertical guides;
   wherein the roof drainage is able to be disposed below a gap between a rear roof edge region of a truck and a loading door opening of a loading dock;
   wherein the truck-side wall extension can extend at an angled direction away from the gutter such that the truck-side wall extension can pass liquid running off of a roof of the truck to the gutter;
   wherein the truck-side wall extension is configured to fold into an interior of an edge region of the truck; and
   wherein the gutter is vertically adjustable by moving along the vertical guides.

2. The roof drainage according to claim 1, further comprising a downspout.

3. The roof drainage according to claim 1, further comprising a building-side wall extension;
   wherein the gutter further comprises a building-side wall opposite to the truck-side wall;
   wherein the building-side wall extension extends from the building-side wall; and
   wherein the building-side wall extension is configured as a curtain.

4. The roof drainage according to claim 1, further comprising at least one motorized setting drive.

5. The roof drainage according to claim 1, wherein the gutter has an overflow barrier at a longitudinal end of the gutter.

6. The roof drainage according to claim 1, further comprising a weight compensation mechanism configured as a spring shaft and/or as a counterweight, the weight compensation mechanism compensating for a weight of the gutter and the truck-side wall extension by providing a reset force greater than the weight of the gutter and the truck-side wall extension, the reset force lifting the gutter and the truck-side wall extension so that the truck-side wall extension can lie against the ceiling of the truck.

7. A roof-drainage system with improved drainage capabilities, the roof-drainage system comprising:
   a building;
   a truck; and
   a roof drainage for the truck, the roof drainage comprising:
      vertical guides;
      a gutter attached to the building via the vertical guides and comprising a truck-side wall; and
      a truck-side wall extension connected to the truck-side wall of the gutter and extending at an angled direction away from the gutter such that when the truck is backed up next to the building so that the gutter is both disposed near a rear of the truck and below a rear roof edge region of the truck, the truck-side wall extension can pass liquid running off of a roof of the truck to the gutter;
   wherein the truck-side wall extension is configured to fold into an interior of an edge region of the truck; and
   wherein the gutter is vertically adjustable by being movable along the vertical guides.

8. The roof drainage system according to claim 7, wherein the truck has a loading opening having a loading opening width;
   wherein the truck-side wall extension has a longitudinal axis and a length along the longitudinal axis; and
   wherein the length is smaller than the loading opening width.

9. A roof-drainage system with improved drainage capabilities, the roof-drainage system comprising:
   a building having an unloading dock having a loading door opening; and
   a roof drainage for trucks, the roof drainage comprising:
      a gutter attached to the building, extending across the loading door opening, being vertically adjustable along the building, and comprising a truck-side wall; and
      a truck-side wall extension connected to the truck-side wall and extending at an angled direction away from the gutter such that the truck-side wall extension can pass liquid running off of a roof of a truck to the gutter;

wherein the truck-side wall extension is configured to fold into an interior of an edge region of the truck.

10. The roof drainage system according to claim 9, further comprising a downspout connected to the gutter and disposed outside of the loading door opening.

11. The roof drainage according to claim 1, wherein the gutter is configured to be horizontally adjustable parallel to a longitudinal axis of the gutter.

12. The roof drainage according to claim 1, wherein the truck-side wall extension is configured to be horizontally adjustable parallel to a longitudinal axis of the gutter.

* * * * *